Aug. 15, 1961 F. DAVID 2,996,701

NONVOLATILE BINARY COMPARATOR

Filed Nov. 7, 1957 2 Sheets-Sheet 1

Aug. 15, 1961 F. DAVID 2,996,701

NONVOLATILE BINARY COMPARATOR

Filed Nov. 7, 1957 2 Sheets-Sheet 2

INVENTOR.
FREDDY DAVID

BY Richard G. Stahr
ATTORNEY

United States Patent Office 2,996,701

Patented Aug. 15, 1961

2,996,701

NONVOLATILE BINARY COMPARATOR

Freddy David, Henrietta, N.Y., assignor to General Dynamics Corporation, Rochester, N.Y., a corporation of Delaware Filed Nov. 7, 1957, Ser. No. 695,053
8 Claims. (Cl. 340—174)

Figure 1:
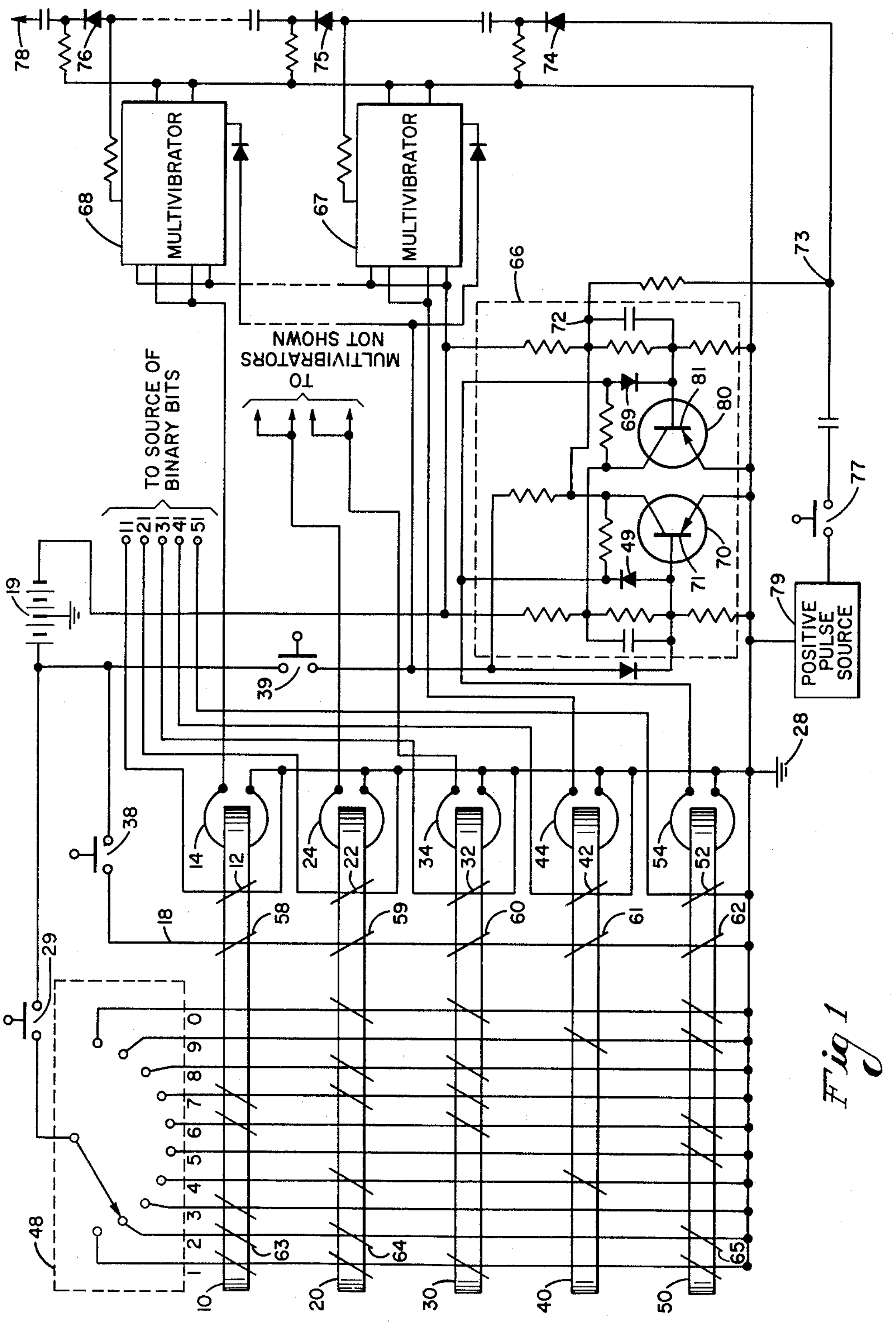

The present invention relates to comparator devices, and more specifically to comparator devices of the nonvolatile type.

Certain applications may require a comparator device which is capable of storing a reference character in binary form and later comparing other binary form intelligence from another source with the stored reference character. An additional requirement may be that the device be of the nonvolatile type, that is, that the stored information is not destroyed in the event of a power failure or other causes. For purposes of illustration only, and in no way intending or inferring that the present invention be restricted thereto, an example of an application which requires a comparator device possessing these characteristics is in the teletypewriter switching art. In this instance, all messages which are received at a switching station for retransmission to one or many receiving stations are assigned three digit serial numbers beginning with 001 for the first message of the day from each transmitting station. To insure that no messages are unknowingly lost, the respective digits of the serial number of the next incoming message from each transmitting station are separately stored in binary form at the switching station as reference characters with which the respective incoming message binary form serial number digits are compared.

Many of the prior art systems utilized mechanical relays or rotary switches in comparator devices. These systems are limited as to the speed at which they may be operated and the moving parts require considerable maintenance attention.

Other comparator devices employ electronic tubes or glow discharge devices. While these devices may be operated at higher speeds than the mechanical devices, they have the disadvantage of erasing the information contained therein upon the failure of the station power.

For these reasons, it has been found desirable to develop a more efficient and reliable comparator device which will eliminate all moving parts and which will be of the nonvolatile type, that is, the stored information will not be erased upon the failure of the local power supply.

It is an object of this invention to provide an improved comparator device which will obviate the disadvantages of the prior art.

It is another object of this invention to provide a comparator device which will eliminate the requirement of moving parts.

It is another object of this invention to provide a comparator device which will be of the nonvolatile type.

In accordance with this invention, the respective bits of a character expressed in binary form are compared with the corresponding bits of a reference character magnetically stored in binary form in a matrix of magnetic members, each of which may be magnetically saturated in two conditions of saturation and each of which produces an output signal when the respective bits and the corresponding magnetically stored bits are of similar polarity.

Figure 2:
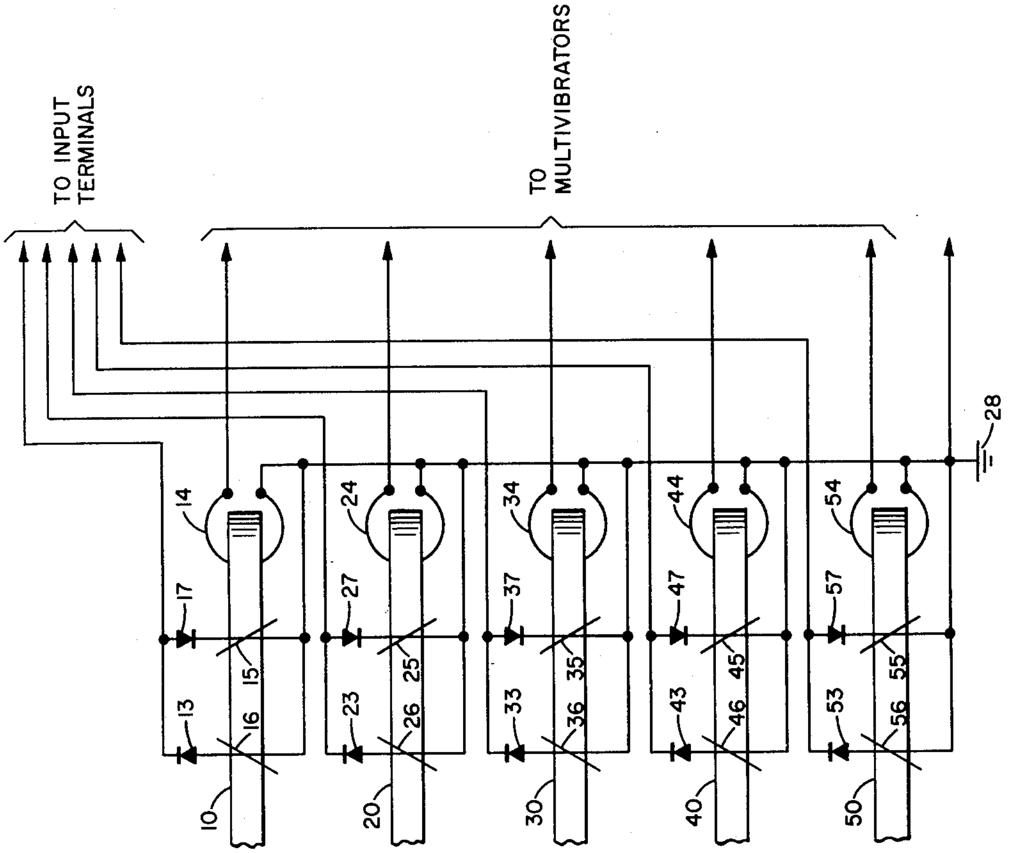

For a better understanding of the present invention, together with further objectives, advantages and features thereof, reference is made to the following description and accompanying drawings, in which:

FIGURE 1 of the drawings is a preferred embodiment of this invention; and,

FIGURE 2 of the drawings is a fragmentary view of another embodiment of this invention in which like elements are given like characters of reference.

While the present description is in reference to the application of this invention in a teletypewriter switching system, it should be specifically understood that the invention may be used in any system wherein the comparison of binary intelligence with a known reference is desired.

In FIG. 1 of the drawing, there is illustrated, in schematic form, a comparator device, hereinafter referred to as a device, in accordance with this invention. The device consists of a number of toroidal magnetic members or cores, indicated by reference numerals 10, 20, 30, 40 and 50, each composed of a magnetic material having substantially square hysteresis loop characteristics and each of which may be magnetically saturated in either of two conditions of saturation, termed the "P" condition and the "N" condition. These cores may be of any desired shape; however, a toroidal shape is preferred. For reasons of drawing clarity and simplification, these cores have been illustrated as elongated rectangles. A number of input or selecting coils, 1–9, inclusive, and 0 are provided, one for each character. Each selecting coil consists of a number of coupling windings, which are wound upon predetermined combinations of the core member in accordance with a binary code, connected in series. The coupling winding turns upon the respective cores are represented by a line making an acute angle with the core, the sense of the winding being represented by the direction of the acute angle. An acute angle to the left indicates an "N" sense winding while an acute angle to the right indicates a "P" sense winding. The respective selecting coils 1–9, inclusive, and 0 are illustrated by straight vertical lines, connecting a number of coupling winding representative lines, which represent the serial connections of the windings to form a coil. One end of each of the input coils may be connected to a point of reference potential or ground as indicated at reference numeral 28. To reset the device, or to drive all of the cores to either the "P" or the "N" condition of saturation, a reset coil 18 is provided which consists of five coupling windings 58 through 62, inclusive, connected in series, one for each of the core members. One end of this reset coil 18 may also be connected to the point of reference potential or ground, indicated at reference numeral 28.

In the teletypewriter binary code, each character is represented by five information bits termed "marks" and "spaces." Therefore, five magnetic core members are used in the device of this invention when employed for this service. It is to be understood that more or less magnetic core members may be required in other applications which may employ a binary code of more or less information bits per character.

For purposes of clarity in this specification and in no way intending to be limited thereto, the "mark" bits of the teletypewriter binary code will be referred to as positive bits and the "space" bits of the teletypewriter code will be referred to as negatve bits, while the "P" condiion of saturation of the respective magnetic member will correspond to the "mark" or positive bits and the "N" condition of saturation of the respective magnetic members will correspond to the "space" or negative bits.

To initially condition the device for operation, reset pushbutton 38 is depressed, completing an energizing circuit through reset coil 18 from a source of D.C. power indicated at 19. The energization of reset coil 18 drives all of the core members to their "N" condition of saturation through the associated coupling windings 58–62, inclusive, which, since they form an acute angle to the left, are "N" sense windings. At this time, therefore, all of the core members are in the condition of saturation, the "N" condition, which corresponds to the "space" or negative bits of a binary code.

To complete the magnetic storage of a reference numeral in binary form for later comparison with another character in binary form, selecting coils 1–9, inclusive, and 0 are provided. Each of these coils include one or more series coupling "P" sense windings. The coupling windings included with each coil are coupled to predetermined combinations of the magnetic members according to the "mark" bits of the binary code being used. The energization of any of the selecting coils will drive the core members to which it is coupled to their opposite or "P" condition of saturation, which corresponds to the "mark" or positive bits of a binary code. The magnetic members which are not coupled to the selecting coil which has been energized, of course, remain in their "N" condition of saturation. By driving all of the magnetic members to one of their conditions of saturation, corresponding to either the positive or negative bits of a binary code, and then driving certain combinations of the magnetic members to their other condition of saturation, corresponding to the opposite polarity bits of a binary code, through the use of selecting coils, a reference character may be magnetically stored in binary form, the respective magnetic members being in the condition of saturation corresponding to the respective positive or negative bits of another character expressed in binary form with which the reference character is to be compared.

Since, in this application, we are concerned only with numerals, ten selecting input coils are required. It is to be again understood that in applications requiring more or less than ten characters, correspondingly more or less input selecting coils may be required.

Assuming, for purposes of illustration, the numeral "two" is to be the reference character with which another binary form numeral is to be compared. As the teletypewriter binary code for the numeral "two" is "mark"—"mark"—"space"—"space"—"mark," it will hereinafter be referred to as "positive"—"positive"—"negative"—"negative"—"positive." After the magnetic members have been reset to their "N" condition of saturation in a manner as described before, by revolving selector switch 48 to selecting coil 2 and depressing pushbutton 29, an energizing circuit is completed through selecting coil 2 from a source of D.C. potential indicated at 19. The energization of selecting coil 2 drives magnetic members 10, 20 and 50 to their "P" condition of saturation, corresponding to the "mark" or "positive" bits of the teletypewriter binary code for the numeral "two," through the associated coupling windings 63, 64 and 65 which, since they form an acute angle to the right, are "P" sense windings. Magnetic members 30 and 40, however, remain in their "N" condition of saturation, corresponding to the "space" or "negative" bits of the teletypewriter binary code for the numeral "two," as they are not coupled to selecting coil 2 and, therefore, remain unaffected by the energization of this selecting coil. In this manner, the reference character "two" is magnetically stored in binary form in the magnetic core members of the device of this invention.

Associated with each magnetic member is an individual input coil including a coupling winding. One end of each of these input circuits is connected to respective input terminals 11, 21, 31, 41 and 51, while the other end may be connected to point of reference potential 28. The coupling winding turns, shown at 12, 22, 32, 42 and 52, upon the respective cores, are represented by a line making an acute angle with the core to the left as shown in FIG. 1.

To compare a character expressed in binary form with the magnetically stored reference character, the respective bits of the binary character are impressed successively or simultaneously upon input terminals 11, 21, 31, 41 and 51 and, hence, upon the respective input coupling windings, thereby energizing the respective input coupling windings individually. This may be accomplished through any desirable scheme which, since it forms no part of this invention, will not be described in detail in this specification.

As the input coupling windings are wound in a manner to render them "N" sense windings when energized by a positive pulse appearing on the respective input terminals, the condition of saturation of the respective magnetic members which are in their "P" condition of saturation, corresponding to the "mark" or "positive" bits of the binary code being used, will be reversed through the energization of the respective input coupling windings by respective "mark" or "positive" binary bits. Any of the magnetic members which are in their "N" condition of saturation, corresponding to the "space" or "negative" bits, will be unaffected by the energization of their respective input winding by a "mark" or "positive" bit.

Conversely, the condition of saturation of the respective magnetic members which are in their "N" condition of saturation, corresponding to the "space" or "negative" bits of the binary code, will be reversed through the energization of the respective input coupling windings by respective "space" or "negative" binary bits, while any of the magnetic members which are in their "P" condition of saturation, corresponding to the "mark" or "positive" bits, will be unaffected by the energization of their respective input windings by a "space" or "negative" bit.

The sense of the coupling windings individual to each magnetic member, therefore, is such that the energization of the respective windings by a respective binary bit having a polarity similar to that of the bit magnetically stored in the respective core member will produce a reversal of the condition of saturation of that member; whereas, a dissimilarity between the polarity of the energizing bit and the magnetically stored bit will produce no change in the condition of saturation of that magnetic member.

Another embodiment of this invention with which the same results may be achieved is shown in FIG. 2. Associated with each magnetic member is individual first and second polarized parallel input circuits, each including a polarizing diode and a coupling winding. These input circuits are connected in parallel to respective input terminals 11, 21, 31, 41 and 51. Through these connections, therefore, the respective bits of a binary code impressed upon the input terminals are also impressed upon the respective parallel input circuits individually, thereby energizing the responsive winding of each pair. The other side of these input circuits may be connected to a point of reference potential indicated at reference numeral 28.

Polarizing diodes 17, 27, 37, 47 and 57 of the respective first input circuits are of such polarity as to render the respective first input circuits responsive to only the "positive" bits of the teletypewriter binary code. Since the coupling windings 15, 25, 35, 45 and 55 of the respective first input circuits form acute angles to the left, they are "N" sense windings. The energization of these windings by a "positive" bit, therefore, will reverse the condition of saturation of the respective magnetic members which are in their "P" condition of saturation corresponding to the "mark" or "positive" bits of the binary code being used. Magnetic members already in their "N" condition of saturation will be unaffected by the energization of the respective first input coupling winding.

Polarizing diodes 13, 23, 33, 43 and 53 of the respective second input circuits are of such polarity as to render the respective second input circuits responsive to only the "negative" bits of the teletypewriter binary code. Since the coupling windings 16, 26, 36, 46 and 56 of the respective second input circuits form acute angles to the right, they are "P" sense windings. The energization of these windings by a "negative" bit, therefore, will reverse the condition of saturation of the respective magnetic members which are in their "N" condition of saturation corresponding to the "space" or "negative" bits of the binary code being used. Magnetic members already in their "P" condition of saturation will be unaffected by the energization of the respective second input coupling winding.

The sense of the parallel input coupling windings individual to each magnetic member, therefore, is such that the energization of the responsive winding by a respective binary bit having a polarity similar to that of the bit magnetically stored in the respective core member will produce a reversal of the condition of saturation of that magnetic member; whereas, a dissimilarity between the polarity of the energizing bit and the magnetically stored bit will produce no change in the condition of saturation of that magnetic member.

As the condition of saturation of any of the respective magnetic member is reversed, an output signal will appear in the respective output circuits 14, 24, 34, 44 and 54. The indication, therefore, of an agreement between the respective bits of the magnetically stored reference character and the respective bits of the character with which it is compared, is the appearance of an output pulse in the respective output circuit for each bit or a total of five.

Since an indication of an agreement between the binary character from another source and the magnetically stored reference character is the appearance of an output signal in each of the output circuits individually coupled to each of the magnetic members, a circuit responsive to five signals must be utilized.

To do this, a conventional bistable multivibrator circuit may be coupled to one side of each of the respective output coils while the other side of each of the output coils may be connected to a point of reference potential indicated at 28.

As the multivibrator circuits may be of conventional design, only one has been shown in detail and is indicated at 66. Blocks 67 and 68 represent two more identical multivibrator circuits while dotted lines between blocks 67 and 68 are shown to indicate that two more of these circuits, which are required, may be inserted but not shown in the interest of drawing simplicity. The connections to these multivibrator circuits, of course, are identical to the detailed connections as indicated in respect to multivibrator circuit 66.

Since, in the process of magnetically storing a reference character in the device, some or all of the magnetic members may have their condition of saturation changed, thereby producing an output circuit in their respective output coils, the multivibrator chain must be reset prior to the application of the binary bits of a character from another source to the respective input terminals 11, 21, 31, 41 and 51. To do this, pushbutton 39 is depressed which places a positive voltage from the D.C. source 19 upon the base 71 of transistor 70. The appearance of a positive voltage upon this base extinguishes the PNP type transistor 70 in that the base is now positive in respect to the emitter. This reset voltage is simultaneously applied to the bases of all of the first transistors in each of the multivibrator circuits simultaneously, as indicated.

Since either a positive-going or a negative-going signal may appear in the respective output circuits, depending upon the direction of the reversal of the condition of saturation of the respective magnetic members, each of the output circuits is connected in parallel to the respective bases of both of the transistors in each multivibrator through polarizing diodes. These diodes are shown at 49 and 69 in the detailed diagram of multivibrator 66. The remainder of the multivibrators in the chain are connected in a similar manner to other respective output coils. Should a positive pulse appear in coil 54, it would be applied to base 81 of transistor 80 through diode 69 but would be, of course, rejected by diode 49. The appearance of a positive pulse upon the base 81 of transistor 80 would extinguish transistor 80, which is now conducting since the multivibrator is in its reset condition, thereby igniting transistor 70 through normal multivibrator action. The appearance of a negative pulse in output coil 54 would be applied to base 71 of transistor 70 through diode 49 and would, of course, be rejected by diode 69. The appearance of a negative pulse on base 71 of transistor 70 would fire transistor 70 in that this would render the base negative in respect to the emitter. As transistor 70 conducts, transistor 80 is extinguished through normal multivibrator action. Therefore, the appearance of either a positive- or negative pulse in the output coil will result in the extinguishing of transistor 80. As output coils 14, 24, 34 and 44 are connected to multivibrator circuits in an identical manner, the appearance of positive or negative pulses in these windings will affect their associated multivibrator circuits in the same manner.

As transistor 80 becomes extinguished, point 72 approaches ground potential. This places point 73 at or near ground potential thereby reducing the back bias on diode 74. Diodes 75 and 76 are, of course, also similarly biased through the action of their associated multivibrator circuits 67 and 68. As indicated by dotted lines, the diodes between 75 and 76, not shown, would also be similarly biased through the appearance of a positive or a negative pulse in their associated multivibrator circuits, also not shown.

In the event the comparing and compared binary codes are in agreement, an output will appear in each of the magnetic core output circuits, thereby reducing the back bias of diodes 74, 75 and 76, and the diodes not shown, as previously described. By depressing pushbutton 77, a pulse will appear at terminal 78 from positive pulse source 79 with all diodes biased as previously described, indicating the appearance of five output pulses. Any number of output pulses less than five would leave at least one of the diodes biased sufficiently in its reverse direction so as to block the pulse from positive pulse source 79, thereby precluding the appearance of a signal at terminal 78 from pulse source 79 upon the depression of pushbutton 77.

The output, if any, appearing at terminal 78 may be connected to any utilization device as required, which, since it forms no part of this invention, will not be described in this specification.

In the interest of clarity and simplicity, the operation of the device of this invention has been described herein on the basis of manual operation and the "N" condition of saturation of the respective member corresponding to the negative bits of a binary code. It is to be specifically understood that the operation of the device of this invention may be rendered automatic through the substitution of automatic switching devices for the manual devices described herein and that basis for establishing the relative polarities may be reversed without departing from the spirit of this invention.

While a preferred embodiment of this invention has been shown and described, it will be obvious to those skilled in the art that various modifications and substitutions may be made without departing from the spirit of this invention which is to be limited only within the scope of the appended claims.

What is claimed is:

1. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, means coupled to each of said members for driving all of said members to one of said first or second conditions of saturation corresponding to either the positive or negative binary bits of the reference character, a plurality of selecting means each coupled to predetermined combinations of said members for driving the members of the selected combination to the other condition of saturation corresponding to the other polarity bits of the reference character in response to the energization of said selecting means, input means individually coupled to each of said members for reversing the condition of saturation of only those members which are in the condition of saturation corresponding to the positive bits of the reference character when energized by respective positive bits of a binary code and for reversing the condition of saturation of only those members which are in the condition of saturation corresponding to the negative bits of the reference character when energized by respective negative binary bits of a binary code, means for impressing respective bits of a binary code upon respective ones of said input means for individually energizing said input means, individual output means coupled to each of said members in which an output signal appears in response to the reversal of the condition of saturation of the corresponding member and means for indicating the appearance of an output signal in each of said individual output means.

2. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, means coupled to each of said members for driving all of said members to one of said first or second conditions of saturation corresponding to either the positive or negative binary bits of the reference character, a plurality of selecting means each coupled to predetermined combinations of said members for driving the members of the selected combination to the other condition of saturation corresponding to the other polarity bits of the reference character in response to the energization of said selecting means, a first input means responsive to only the positive bits of a binary code individually coupled to each of said members for reversing the condition of saturation of only those members which are in the condition of saturation corresponding to the positive bits of the reference character when energized by respective positive bits of a binary code, a second input means responsive to only the negative bits of a binary code individually coupled to each of said members in parallel with each of the respective said first input means for reversing the condition of saturation of only those members which are in the condition of saturation corresponding to the negative bits of the reference character when energized by respective negative bits of a binary code, means for impressing respective bits of a binary code upon respective pairs of said first and second input means in parallel for individually energizing either said first or second input means of each respective pair, individual output means coupled to each of said members in which an output signal appears in response to the reversal of the condition of saturation of the corresponding member and means for indicating the appearance of an output signal in each of said individual output means.

3. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, means coupled to each of said members for driving all of said members to one of said first or second conditions of saturation corresponding to either the positive or negative binary bits of the reference character, a plurality of selecting means each coupled to predetermined combinations of said members for driving the members of the selected combination to the other condition of saturation corresponding to the other polarity bits of the reference character in response to the energization of said selecting means, a first input means including a first polarizing means for rendering said first input means responsive to only the positive bits of a binary code individually coupled to each of said members for reversing the condition of saturation of only those members which are in the condition of saturation corresponding to the positive bits of the reference character when energized by respective positive bits of a binary code, a second input means including a second polarizing means for rendering said second input means responsive to only the negative bits of a binary code individually coupled to each of said members in parallel with each of the respective said first input means for reversing the condition of saturation of only those members which are in the condition of saturation corresponding to the negative bits of the reference character when energized by respective negative bits of a binary code, means for impressing respective bits of a binary code upon respective pairs of said first and second input means in parallel for individually energizing either said first or second input means of each respective pair, individual output means coupled to each of said members in which an output signal appears in response to the reversal of the condition of saturation of the corresponding member and means for indicating the appearance of an output signal in each of said individual output means.

4. A system for comparing the successive bits of a character expressed in binary form with the corresponding bits of a reference character magnetically stored in binary form in which an output signal is produced when each successive bit and the corresponding magnetically stored bit are of similar polarity comprising a plurality of magnetic members capable of being magnetically saturated in each a first and a second condition of saturation for magnetically storing a reference character in binary form, a reset coil coupled to each of said members for driving all of said members to one of said first or second conditions of saturation corresponding to either the positive or negative binary bits of the reference character, a pluralty of selecting coils each coupled to predetermined combinations of said members for driving the members of the selected combination to the other condition of saturation corresponding to the other polarity bits of the reference character in response to the energization of said selecting coils, input coils individually coupled to each of said members for reversing the condition of saturation of only those members which are in the condition of saturation corresponding to the positive bits of the reference character when energized by respective positive bits of a binary code and for reversing the condition of saturation of only those members which are in the condition of saturation corresponding to the negative bits of the reference character when energized by respective negative binary bits of a binary code, means for impressing respective bits of a binary code upon respective ones of said input coils for individually energizing said input coils, individual output coils coupled to each of said members in which an output signal appears in response to the reversal of the condition of saturation of the corresponding member and means for indicating the appearance of an output signal in each of said individual output coils.

5. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, a reset coil coupled to each of said members for driving all of said members to one of said first or second conditions of saturation corresponding to either the positive or negative binary bits of the reference character, a plurality of selecting coils each coupled to predetermined combinations of said members for driving the members of the selected combination to the other condition of saturation corresponding to the other polarity bits of the reference character in response to the energization of said selecting coils, a first input coil including a first polarizing means for rendering said first input coils responsive to only the positive bits of a binary code individually coupled to each of said members for reversing the condition of saturation of only those members which are in the condition of saturation corresponding to the positive bits of the reference character when energized by respective positive bits of a binary code, a second input coil including a second polarizing means for rendering said second input coil responsive to only the negative bits of a binary code individually coupled to each of said members in parallel with each of the respective said first input coils for reversing the condition of saturation of only those members which are in the condition of saturation corresponding to the negative bits of the reference character when energized by respective negative bits of a binary code, means for impressing respective bits of a binary code upon respective pairs of said first and second input coils in parallel for individually energizing either said first or second input coils of each respective pair, an individual output coil coupled to each of said members in which an output signal appears in response to the reversal of the condition of saturation of the corresponding member and means for indicating the appearance of an output signal in each of said individual output coils.

6. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, means coupled to each of said members for driving all of said members to one of said first or second conditions of saturation corresponding to either the positive or negative binary bits of the reference character, a selecting means for each reference character each of which is coupled to predetermined combinations of said members for driving the members of the selected combination to the other condition of saturation corresponding to the other polarity bits of the reference character in response to the energization of said selecting means for a given reference character, input means individually coupled to each of said members for reversing the condition of saturation of only those members which are in the condition of saturation corresponding to the positive bits of the reference character when energized by respective positive bits of a binary code and for reversing the condition of saturation of only those members which are in the condition of saturation corresponding to the negative bits of the reference character when energized by respective negative binary bits of a binary code, means for impressing respective bits of a binary code upon respective ones of said input means for individually energizing said input means, individual output means coupled to each of said members in which an output signal appears in response to the reversal of the condition of saturation of the corresponding member and means for indicating the appearance of an output signal in each of said individual output means.

7. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, a reset coil coupled to each of said members for driving all of said members to one of said first or second conditions of saturation corresponding to either the positive or negative binary bits of the reference character, a plurality of selecting coils each coupled to predetermined combinations of said members for driving the members of the selected combination to the other condition of saturation corresponding to the other polarity bits of the reference character in response to the energization of said selecting coils, a first input coil responsive to only the positive bits of a binary code individually coupled to each of said members for reversing the condition of saturation of only those members which are in the condition of saturation corresponding to the positive bits of the reference character when energized by respective positive bits of a binary code, a second input coil responsive to only the negative bits of a binary code individually coupled to each of said members in parallel with each of the respective said first input coils for reversing the condition of saturation of only those members which are in the condition of saturation corresponding to the negative bits of the reference character when energized by respective negative bits of a binary code, means for impressing respective bits of a binary code upon respective pairs of said first and second input coils in parallel for individually energizing either said first or second input coils of each respective pair, an individual output coil coupled to each of said members in which an output signal appears in response to the reversal of the condition of saturation of the corresponding member and means for indicating the appearance of an output signal in each of said individual output coils.

8. A system for comparing the bits of a character expressed in binary form with the corresponding bits of a reference character magnetically stored in binary form in which an output signal is produced when each bit and the corresponding magnetically stored bit are of similar polarity comprising a plurality of magnetic members capable of being magnetically saturated in each a first and a second condition of saturation for magnetically storing a reference character in binary form, a reset coil coupled to each of said members for driving all of said members to one of said first or second conditions of saturation corresponding to either the positive or negative binary bits of the reference character, a selecting coil for each reference character each of which is coupled to predetermined combinations of said members for driving the members of the selected combination to the other condition of saturation corresponding to the other polarity bits of the reference character in response to the energization of said selecting coils for a given reference character, input coils individually coupled to each of said members for reversing the condition of saturation of only those members which are in the condition of saturation corresponding to the positive bits of the reference character when energized by respective positive bits of a binary code and for reversing the condition of saturation of only those members which are in the condition of saturation corresponding to the negative bits of the reference character when energized by respective negative binary bits of a binary code, means for impressing respective bits of a binary code upon respective ones of said input coils for individually energizing said input coils, individual output coils coupled to each of said members in which an output signal appears in response to the reversal of the condition of saturation of the corresponding member and means for indicating the appearance of an output signal in each of said individual output coils.

References Cited in the file of this patent

UNITED STATES PATENTS 2,691,152 Stuart-Williams ---------- Oct. 5, 1954
2,691,153 Rajchman -------------- Oct. 5, 1954
2,734,184 Rajchman -------------- Feb. 7, 1956
2,768,367 Rajchman -------------- Oct. 23, 1956
2,800,643 Mestre ---------------- July 23, 1957
2,846,671 Yetter ----------------- Aug. 5, 1958